Figure 1:
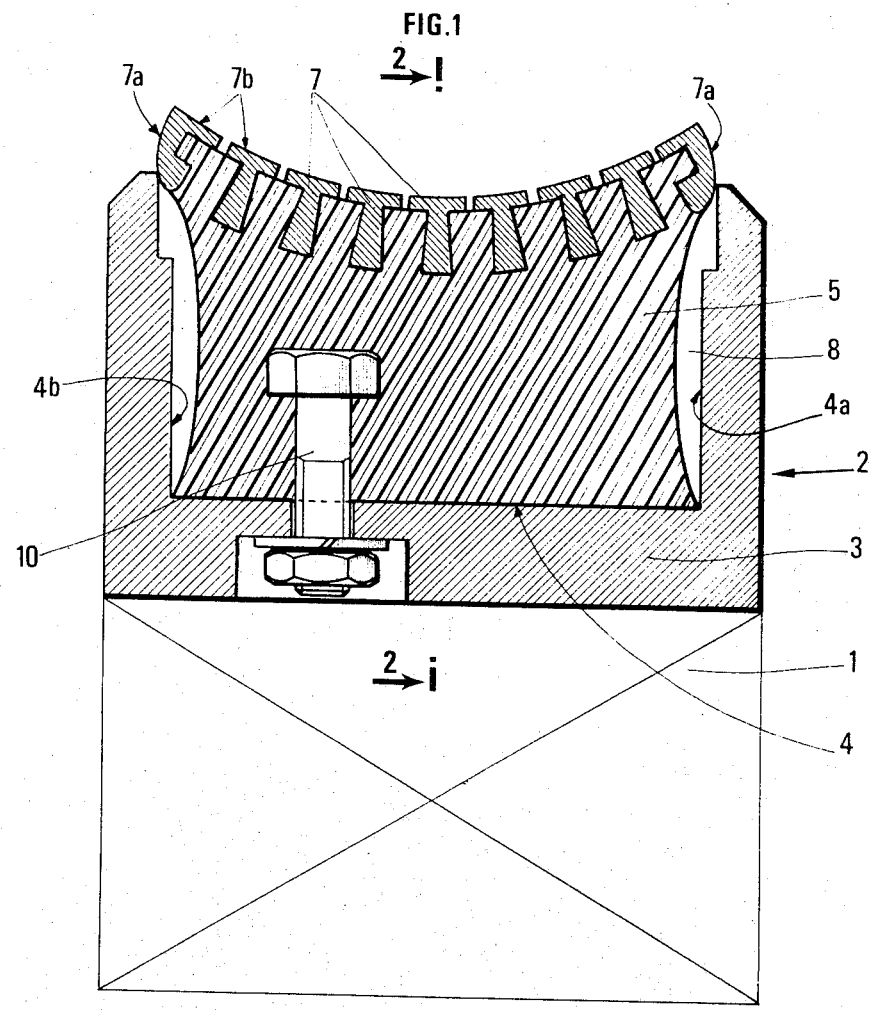

United States Patent [19]
Grolet et al.

[11] 3,778,094
[45] Dec. 11, 1973

[54] GRIPPING SHOE FOR A TRACTION DEVICE ADAPTED FOR PULLING AN ELONGATED MEMBER

[75] Inventors: Pierre Grolet, Orgerus; Jean Thiery, Le Peco, both of France

[73] Assignee: Institut Francais du Petrole, des Carburants et Lubrifiants, Rueil-Malmaison, France

[22] Filed: July 21, 1972

[21] Appl. No.: 273,709

[30] Foreign Application Priority Data
July 22, 1971 France .............................. 7126959

[52] U.S. Cl. ...................... 294/1, 294/002, 226/172
[51] Int. Cl. .............................................. A47f 13/06
[58] Field of Search .................... 226/171, 172, 173; 198/179, 193, 198; 294/DIG. 002, 1

[56] References Cited
UNITED STATES PATENTS
3,308,544  3/1967  White .............................. 198/179 X
2,884,120  4/1959  Bruestle ............................. 226/172
3,054,545  9/1962  Karius ................................ 226/172

*Primary Examiner*—Allen N. Knowles
*Attorney*—Craig & Antonelli

[57] ABSTRACT

A gripping shoe for a traction device adapted for pulling an elongated member, including a rigid body provided with a recess, and forming part of the traction device, a deformable element housed in said recess and integral with said rigid body, said deformable element being provided with gripping means for contacting the elongated member and being constituted of a material resiliently deformable under the action of a compressional stress, substantially without any volume variation of said material, a free space being provided between said deformable element and the walls of said recess so as to accomodate the deformations of said deformable element.

6 Claims, 5 Drawing Figures

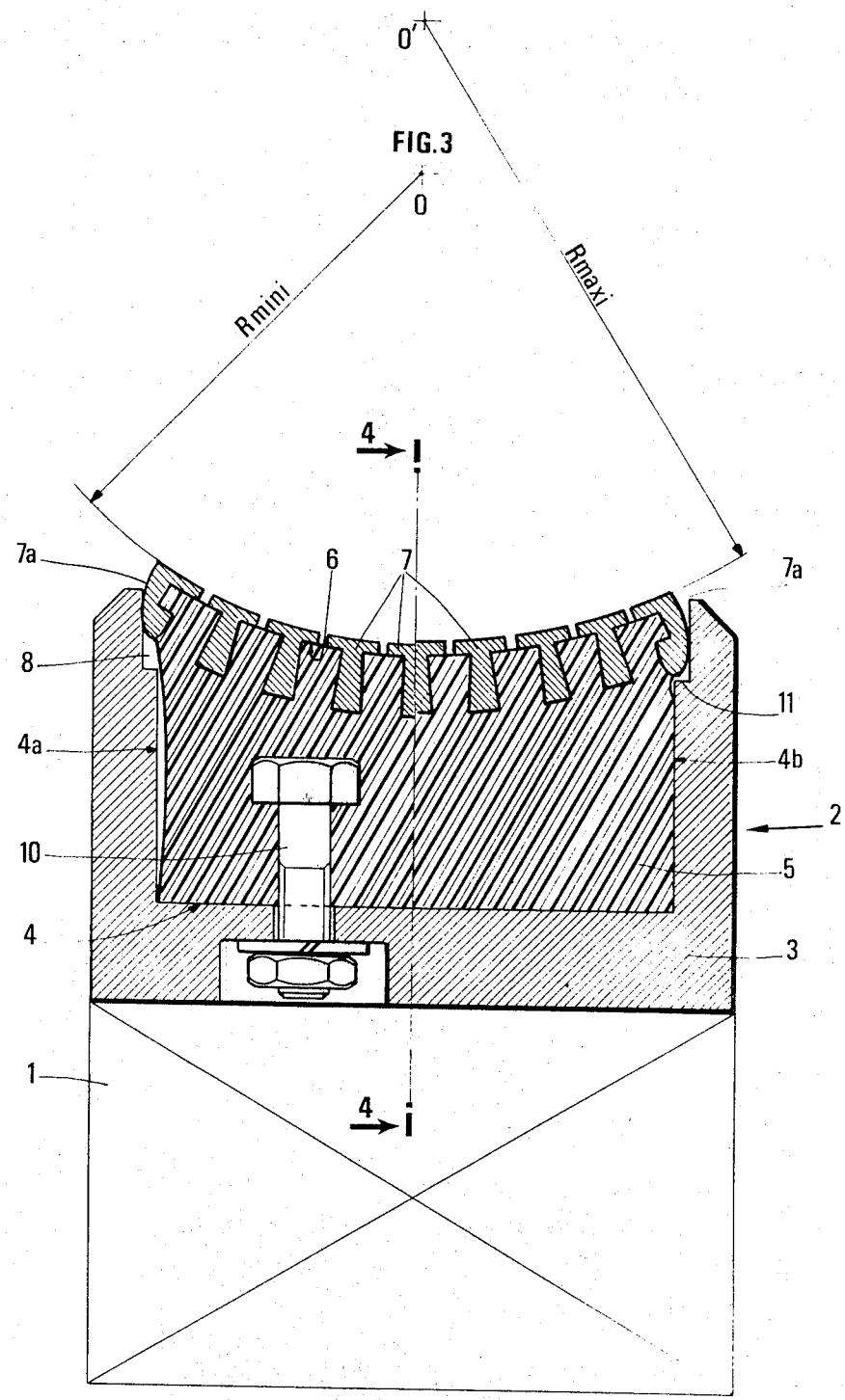

GRIPPING SHOE FOR A TRACTION DEVICE ADAPTED FOR PULLING AN ELONGATED MEMBER

The present invention relates to a gripping shoe for a traction device adapted for pulling an elongated member.

In the following, reference will be made more particularly but not limitatively, to traction endless chain conveyors used for applying a tractive force to an elongated member, such as a tube, a flexible pipe, a cable, etc.

The endless chain conveyors used, up to now, comprise at least one endless chain carried by two toothed wheels, one of which drives the chain. The links of the chain carry gripping shoes which are pressed against the external wall of the elongated member handled through the traction endless chain conveyor.

These gripping shoes generally have a profile adapted to the section of the elongated member and often receive an internal lining for preventing any deterioration of the external wall of the elongated member.

These embodiments suffer from drawbacks which may result in a too rapid deterioration of the external wall of the elongated member. In particular the area of contact of the gripping shoe with the elongated member depends on the cross-section of the elongated member, which varies for example by longitudinal elastic deformation as a result of the load applied thereto.

Moreover the gripping shoes of the conventional type do not allow large variations in the cross-section of the elongated member, thereby considerably reducing the possibilities of use of the endless chain conveyors.

One object of the present invention is accordingly to permit the prevention of the afore-mentioned disadvantages.

Another object of the invention is to provide gripping shoes for traction devices, which adapt themselves to the variations in the cross-section of the elongated member and provide for a substantially constant contact surface with this elongated member.

A further object of the invention is to obtain a good application of the gripping shoe onto the elongated member in spite of an insufficient parallelism between the elongated member and the part of the traction device along which the gripping shoes are applied.

A still further object of the present invention is to permit the use of the same endless chain conveyor for handling elongated members of very different cross sections.

The gripping shoe according to the invention equipping an endless chain traction device for pulling an elongated member, includes a rigid body provided with a recess and integral with the traction device, a deformable element housed in said recess and integral with said rigid body, said deformable element being provided with rigid gripping means for contacting the elongated member.

This gripping shoe is further characterized in that said deformable element is constituted of a material resiliently deformable under the action of a compressional stress, substantially without any variation in the volume of said material and in that a free space is provided between said deformable element and the walls of said recess, to accomodate the deformations of said deformable element.

More particularly, according to a preferred embodiment of the invention, the ends of said gripping means have a concave shape in abutment against the walls of said recess which are perpendicular to the direction of displacement of said elongated member.

Figure 5:
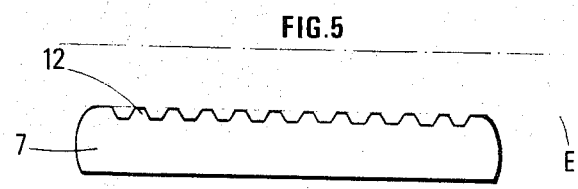
Figure 2:
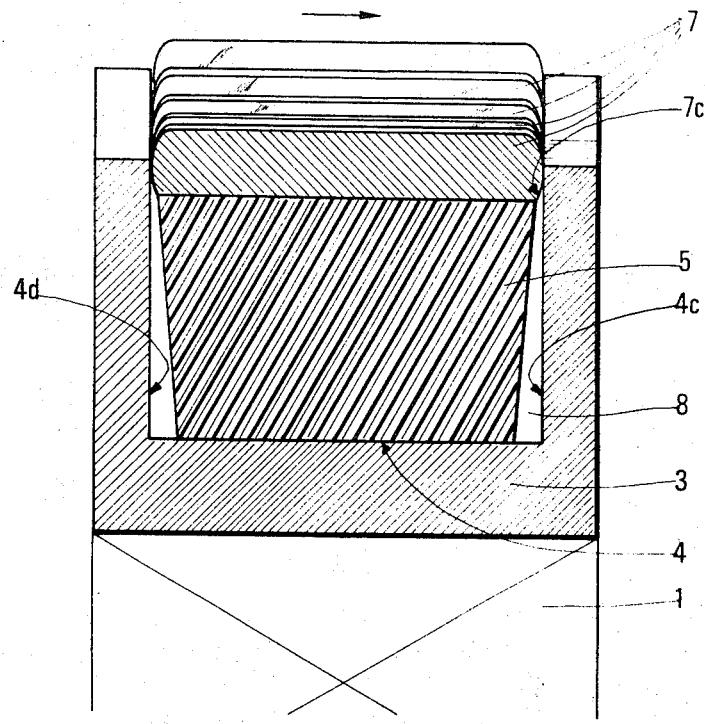
Figure 4:
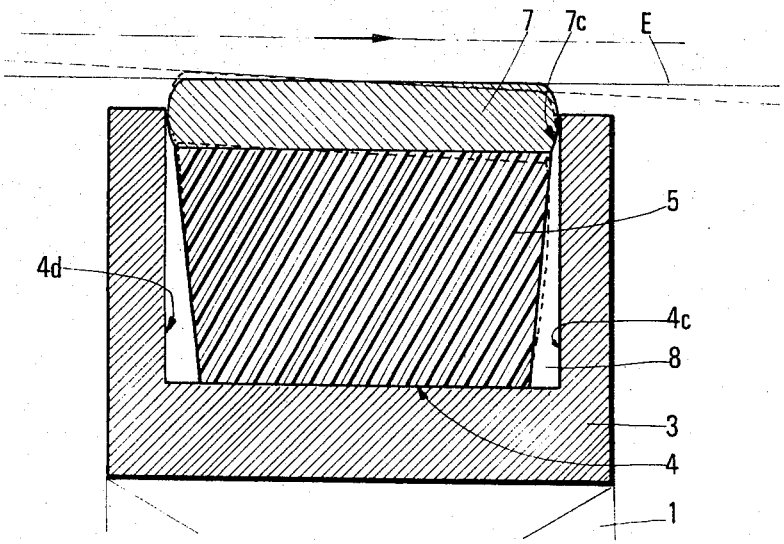

The invention will be more fully understood and other advantages will become apparent from the following description of a non limitative embodiment, illustrated by the accompanying drawings wherein :

FIG. 1 diagrammatically illustrates a cross-section of the gripping shoe according to the invention, for an endless chain conveyor, FIG. 2 is a cross-section along line II—II of FIG. 1, FIGS. 3 and 4 diagrammatically illustrate the operation of a gripping shoe according to the invention, and FIG. 5 illustrates an embodiment of the gripping means in contact with the elongated member.

FIG. 1 is a cross-sectional view along a plane at right angles to the axis of the elongated member, of a particular but non-limitative embodiment of a gripping shoe according to the invention, equipping an endless chain conveyor, of any known type, consisting for example of at least one endless chain carrying shoes for gripping the elongated member.

In this figure, reference numeral 1 designates a link of the endless chain of the non-illustrated endless chain conveyor.

The gripping shoe for the elongated member, which is for example a flexible drill pipe, is designated as a whole by reference numeral 2.

This gripping shoe is made integral with the link 1 which carries it, through any known suitable means, which has not been shown, forming no part of this invention.

The gripping shoe according to the invention, illustrated in FIG. 1 and in FIG. 2 which is a cross-sectional view along line II—II of the gripping shoe illustrated by FIG. 1, is constituted by :

a body or rigid case 3, wherein is provided a recess 4, gripping means adapted to come in contact with the external wall of the elongated member E, and an element 5 which is deformable by compression.

The body or case 3 is made of a rigid material capable of withstanding the forces required for the traction of the elongated member E. In this casing is provided a housing 4 limited by two lateral walls 4a and 4b (FIG. 1) and two end walls 4c and 4d (FIG. 2) respectively parallel and perpendicular to the direction of displacement of the elongated member E, indicated by the arrow in FIG. 2. The gripping means is constituted by a plurality of gripping elements 7 extending in the direction of the displacement of the elongated member and whose surface 7b can be adapted to the shape of this elongated member. The gripping elements 7 are made of a rigid material, capable of withstanding the forces developed for the traction of the elongated member. Their end surfaces 7c, substantially perpendicular to the direction of the elongated member E, are in contact with the walls 4c and 4d of the recess 4. Preferably, for reasons which are indicated hereinafter, the surface 7c have a concave shape. Similarly, the end gripping elements , located near the side walls 4a and 4b, have a concave surface 7a, in contact with these walls.

The deformable element 5 is housed in the recess 4. It is secured to the bottom of the latter, for example by means of bolts 10 whose threaded part is embedded in the body of this indeformable element.

The gripping elements are carried by the element 5 wherein these gripping elements 7 are anchored.

In the embodiment of gripping shoe illustrated in these drawings, the element 5 is constituted by a block of material which is resiliently deformable under the action of a compressional stress applied thereto. It can be made of an elastomer, whose characteristics of hardness, capability of deformation and internal cohesion will be selected by those skilled in the art in accordance with the forces to be applied to the gripping shoe.

Between the block constituting the element 5 and the walls 4a to 4d of the recess 4, there has been provided a recess 8, whose utility will become apparent in the following.

This recess can be obtained, as illustrated in the drawing, by a particular geometrical configuration of the block constituting the deformable element 5 and/or by suitable machining of the walls of the recess 4. In the considered case of a gripping shoe equipping an endless chain conveyor for a flexible drill pipe, it will be preferred to use, for constituting the element 5, a material which, under a compressional stress, is deformed resiliently, without the overall volume of this material being substantially changed. It will, for example, be advantageous to choose a polyurethane such as that known under the trade mark "Adiprene."

FIGS. 3 and 4 show in operation a gripping shoe according to the invention, during the traction of a flexible drill pipe E.

The traction device urges the gripping shoe with a force F against the elongated member E.

Under the action of the pressure, the element S is so deformed that each element of the gripping means is applied against the external wall of element E. On the left side of FIG. 3, the gripping shoe according to the invention has been illustrated in contact with a flexible pipe having a radius equal to the minimum radius which can be accomodated by the gripping shoe, whereas on the right side of the drawing the same gripping shoe has been illustrated in contact with a flexible pipe having a radius much greater than this minimum radius. By this way it can be seen that the gripping shoe accomodates very easily elongated members of any diameter, which enables a substantially constant contact area to be maintained between the gripping shoe and the elongated member, and thus to maintain a substantially constant traction force, irrespective of the variations in the cross-section of the pipe E. Moreover the same traction device equipped with gripping shoes according to the invention may be used to handle elongated elements having different cross-sections or elongated elements exhibiting large cross-section variations over their whole length.

A shoulder 11 provided on the walls 4a and 4d permits the blocking of the end elements of the gripping means, so that the deformable element S cannot be subjected to stresses greater than the elastic limit of compression of the material constituting the deformable element S.

In FIG. 4 the gripping shoe has been diagrammatically illustrated in a section along line IV—IV of FIG. 3. The forces exerted to displace the element E are directly transmitted from the gripping element 7 to the case 3 through the surfaces 7a which are in contact with the walls 4c and 4d of the recess 4. In this way the deformable element 5 is not subjected to shearing stresses liable to destroy it by application of a high tractive force.

FIG. 4 illustrates in solid lines the position of a gripping element 7 applied against an element E whose axis is parallel to the direction of displacement indicated by the arrow.

In the case where the element E has a slightly conical shape, or when it takes an inclined position relative to the direction of displacement of the gripping shoe, the gripping element 7, under the action of the deformable element 5 is automatically applied against element E (position shown in dotted line). This pivoting motion of the gripping element 7, which must remain in contact with the walls 4c and 4d of the recess, is made possible due to the concave shape of the walls 7c of the gripping element 7.

FIG. 5 illustrates the profile of a gripping element.

In order to increase the gripping coefficient between the outer wall of the element E and the gripping element 7, the latter has been provided with teeth 12 which can slightly penetrate into the material constituting the element E.

The shape and size of the teeth will be determined as a function of the tractive force to be exerted through the gripping elements 7, and of the materials constituting this gripping elements and the elongated member.

What we claim is:

1. A gripping shoe for a traction device for pulling an elongated member, including a rigid body wherein is provided a recess, said body being integral with the traction device, a deformable element housed in said recess and integral with said rigid body, said deformable element being provided with rigid gripping means for contacting the elongated member, wherein said deformable element is made of a material resiliently deformable under the action of a compressional stress, substantially without any variation in the volume of said material, and a free space is provided between said deformable element and the walls of said recess to accomodate the deformations of said deformable element.

2. A gripping shoe for a traction device for pulling an elongated member, including a rigid body wherein is provided a recess, said body being integral with the traction device, a deformable element housed in said recess and integral with said rigid body, said deformable element being provided with rigid gripping means for contacting the elongated member, wherein said deformable element is made of a material resiliently deformable under the action of a compressional stress, substantially without any variation in the volume of said material and a free space is provided between said deformable element and the walls of said recess to accomodate the deformations of said deformable element, and wherein the end walls of said gripping means have a concave shape bearing on the walls of said recess which are perpendicular to the direction of displacement of the elongated member.

3. A gripping shoe according to claim 1, wherein said gripping means is constituted by a plurality of rigid elements anchored in said deformable element, said rigid elements being elongated substantially along the direction of displacement of the elongated element.

4. A gripping shoe according to claim 1, wherein said deformable element is made of polyurethane.

5. A gripping shoe according to claim 2, wherein said gripping means is constituted by a plurality of rigid elements anchored in said deformable element, said rigid elements being elongated substantially along the direction of displacement of the elongated element.

6. A gripping shoe according to claim 2, wherein said deformable element is made of polyurethane.

* * * * *

UNITED STATES PATENT OFFICE
CERTIFICATE OF CORRECTION

Patent No. 3,778,094      Dated December 11, 1973

Inventor(s) Pierre Grolet and Jean Thiery

It is certified that error appears in the above-identified patent and that said Letters Patent are hereby corrected as shown below:

In the Specification:

Please change the word "concave" to "convex":

Column 2, Line 3    Concave to Convex

Column 2, Line 63    Concave to Convex

Column 2, Line 65    Concave to Convex

Column 4, Line 16    Concave to Convex

In the Claims:

Column 4, Claim 2, Line 58    Concave to Convex

Signed and sealed this 8th day of April 1975.

(SEAL)
Attest:

RUTH C. MASON
Attesting Officer

C. MARSHALL DANN
Commissioner of Patents
and Trademarks